United States Patent
Kim

(10) Patent No.: US 7,352,849 B2
(45) Date of Patent: Apr. 1, 2008

(54) SMS SWITCHING PRIVATE BRANCH EXCHANGE SYSTEM AND METHOD

(75) Inventor: Yong-Hyun Kim, Gyunggi-Do (KR)

(73) Assignee: LG Nortel Co., Ltd., Seoul (KR)

( * ) Notice: Subject to any disclaimer, the term of this patent is extended or adjusted under 35 U.S.C. 154(b) by 514 days.

(21) Appl. No.: 10/623,613

(22) Filed: Jul. 22, 2003

(65) Prior Publication Data

US 2004/0106419 A1   Jun. 3, 2004

(30) Foreign Application Priority Data

Jul. 25, 2002   (KR) .................. 10-2002-0043767

(51) Int. Cl.
*H04M 1/64*   (2006.01)
(52) U.S. Cl. .................. 379/88.07; 379/88.14; 379/198; 379/258; 455/412.1
(58) Field of Classification Search ............. 379/88.07, 379/88.14, 198, 258; 455/412.1
See application file for complete search history.

(56) References Cited

U.S. PATENT DOCUMENTS

| | | | | |
|---|---|---|---|---|
| 4,458,314 A | | 7/1984 | Grimes ...................... 364/200 |
| 4,599,583 A | * | 7/1986 | Shimozono et al. ........ 332/100 |
| 4,674,083 A | | 6/1987 | Rackin ........................ 370/67 |
| 4,783,796 A | * | 11/1988 | Ladd ........................ 379/88.19 |
| 5,838,766 A | * | 11/1998 | Rand ............................. 379/9 |
| 5,946,386 A | * | 8/1999 | Rogers et al. .......... 379/265.09 |
| 6,252,944 B1 | | 6/2001 | Hansen, II et al. ........ 379/67.1 |
| 6,721,397 B1 | * | 4/2004 | Lu ........................... 379/88.11 |

OTHER PUBLICATIONS

"Access and Terminals (AT); Short Message Service (SMS) for PSTN/ISDN; Short Message Communication between a fixed network Short Message Terminal Equipment and a Short Message Service Centre;" ETSI ES 201 912 (V1.1.1) (Jan. 2002), pp. 2-88, dated 2002.

* cited by examiner

*Primary Examiner*—Fan Tsang
*Assistant Examiner*—Hemant Patel
(74) *Attorney, Agent, or Firm*—KED & Associates, LLP

(57) ABSTRACT

An short message service switching private branch exchange system and a method can reduce costs. The method can include certifying whether a usable DSP exists or not when an office line and a speech path are connected to each other, and transmitting an short message service signal transmitted from the office line to the DSP through a PCM channel if the usable DSP exists. A main processor of the private branch exchange can certify an extension line terminal that will receive short message service, generate an short message service signal having a format corresponding to a kind of the extension line terminal by using the DSP, and transmit the formatted SMS signal to an extension line interface unit of a corresponding extension line terminal. The system switches an SMS signal between an office line and an extension line by sharing the DSP, for example, by time division.

18 Claims, 5 Drawing Sheets

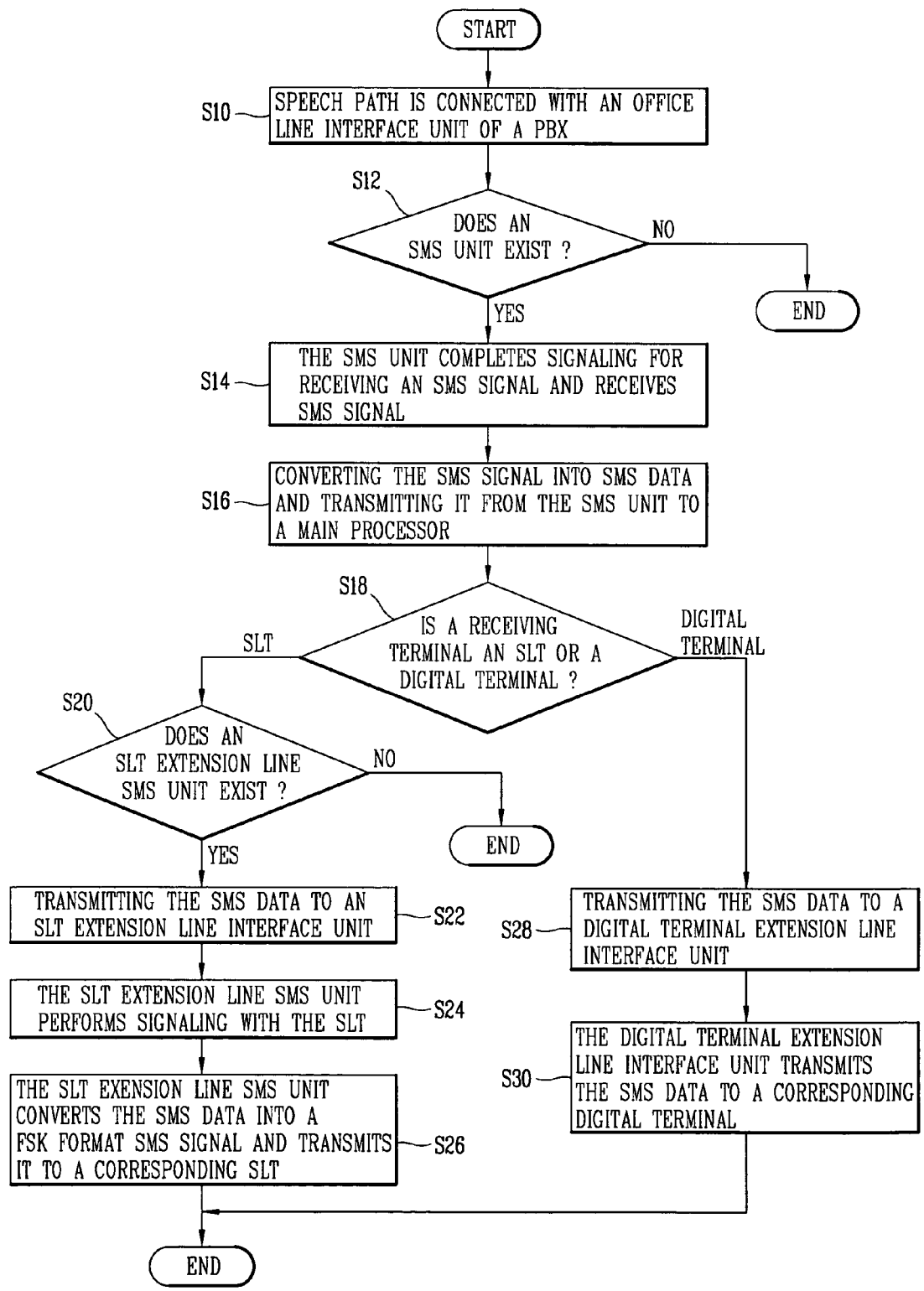

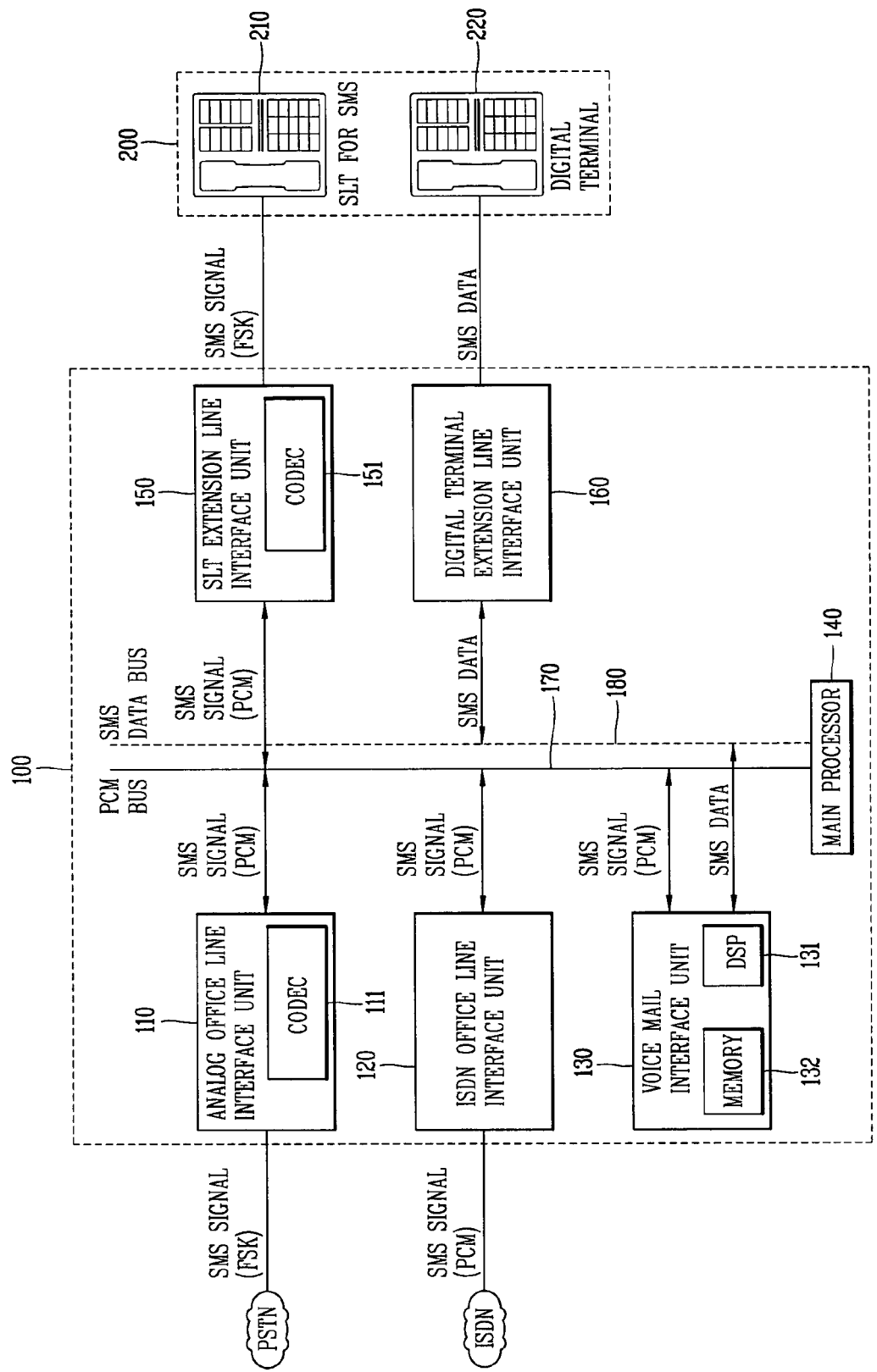

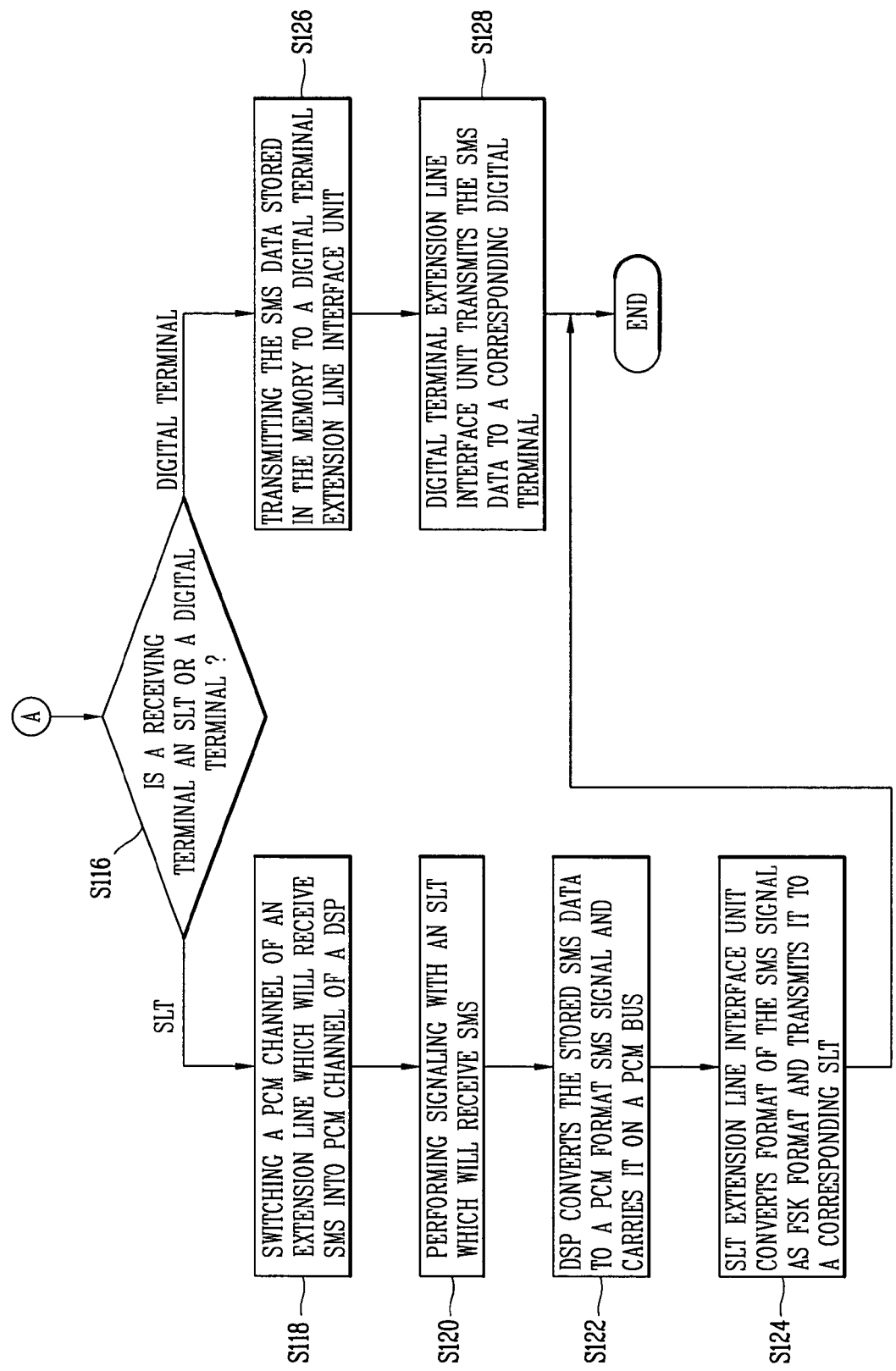

SMS SWITCHING PRIVATE BRANCH EXCHANGE SYSTEM AND METHOD

BACKGROUND OF THE INVENTION

1. Field of the Invention

The present invention relates to a private branch exchange (PBX). More particularly, the present invention relates to a digital private branch exchange system for switching a short message service and a switching method.

2. Background of the Related Art

Generally, a private branch exchange is an exchange for switching between extension lines in a business site such as an office, a company, a factory, a hotel, etc. or for switching between an extension line and an office line. Methods for providing a short message service (SMS) to users of the extension lines connected to the private branch exchange by using the private branch exchange are being researched.

FIG. 1 is a construction view of a related art digital private branch exchange for switching the SMS. As shown in FIG. 1, a digital private branch exchange 10 for switching the SMS converts an SMS signal received through an office line such as a public switched telephone network (PSTN), an integrated services digital network (ISDN), etc. into a format corresponding to an extension line terminal 90 and then switches into the extension line terminal 90.

The extension line terminal 90 includes a single line terminal SLT for SMS 92 and a digital terminal 94. The private branch exchange 10 includes: an analog office line interface unit 20; an ISDN office line interface unit 30; a voice mail interface unit 40; a SLT extension line interface unit 60; a digital terminal extension line interface unit 70; and a main processor 50. The units 20, 30, 40, 50, 60, and 70 are connected to one another by an SMS data bus 80, and the main processor 50 controls SMS data exchange among the units.

The analog office line interface unit 20 interfaces with an analog office line such as the PSTN. The analog office line interface unit 20 includes an analog office line SMS unit 21 for detecting an SMS signal of a frequency shift keying (FSK) format transmitted through the analog office line and converting the detected SMS signal into SMS data. The SMS data can be data from the analyzed SMS signal.

The ISDN office line interface unit 30 interfaces with an ISDN office line. The ISDN office line interface unit 30 includes an ISDN office line SMS unit 31 for detecting an SMS signal of a pulse code modulation (PCM) format transmitted through the ISDN office line and converting the detected SMS signal into SMS data.

The voice mail interface unit 40 provides a voice mail service function. The voice mail interface unit 40 includes a digital signal processor (DSP) 41 for compressing voice and reproducing the compressed voice, and a memory 42 for storing the voice compressed by the DSP 41.

The main processor 50 controls the entire private branch exchange 10. The main processor 50 certifies an extension line terminal that will receive the SMS and transmit the SMS to the corresponding extension line terminal.

The SLT extension line interface unit 60 connects the SLT 92 and the private branch exchange 10. The SLT extension line interface unit 60 includes a SLT extension line SMS unit 61 for converting SMS data transmitted from the main processor 50 into an SMS signal of an FSK format. The digital terminal extension line interface unit 70 connects the private branch exchange with the digital terminal 94, and transmits SMS data transmitted from the main processor 50 to the corresponding digital terminal 94.

Operations for switching SMS in the digital private branch exchange 10 will now be described. FIG. 2 shows a method for switching SMS in the digital private branch exchange. As shown in FIG. 2, if a speech path is connected between the private branch exchange 10 and the office line board (the analog office line interface unit 20) or the ISDN office line interface unit 30 before the SMS signal is received, the private branch exchange 10 certifies whether a corresponding SMS unit is connected to a corresponding office line board or not (S12).

If the corresponding SMS unit is not connected to the corresponding office line board, the private branch exchange 10 finishes a procedure for receiving the SMS. However, if the corresponding SMS unit is connected to the corresponding office line board, the private branch exchange 10 finishes signaling for receiving the SMS by using the corresponding SMS unit and then receives the SMS signal (S14). When the corresponding office line board is the analog office line interface unit 20, the analog office line SMS unit 21 receives an SMS signal of an FSK format, and when the corresponding office line board is the ISDN office line interface unit 30, the ISDN office line SMS unit 31 receives an SMS signal of pulse code modulation format.

The corresponding SMS unit which has received the SMS signal converts the SMS signal into SMS data and then transmits to the main processor 50 through the SMS data bus 80. That is, the analog office line SMS unit 21 converts the SMS of an FSK format into the SMS data, and the ISDN office line SMS unit 31 converts the SMS signal of a PCM format into the SMS data (S16).

The main processor 50 certifies that a receiving terminal of the SMS is an SLT or a digital terminal on the basis of the received SMS data (S18). If the receiving terminal of the SMS (an extension line terminal which will receive the SMS data) is the SLT 92, the main processor 50 certifies whether the SLT extension line interface unit 60 connected to the SLT 92 is provided with the SLT extension line SMS unit 61 or not (S20). If the SLT extension line SMS unit is connected to the SLT extension line interface unit 60, the main processor 50 transmits the SMS data to the SLT extension line interface unit 60 (S22).

The SLT extension line SMS unit 61 of the SLT extension line interface unit 60 performs signaling with the SLT 92 (S24), and converts the SMS data into an SMS signal of an FSK format then transmits the converted SMS signal of an FSK format to the SLT 92 (S26). Then, the SLT 92 displays the received SMS signal on a display unit.

However, if the receiving terminal of the SMS (the extension line terminal which will receive the SMS data) is the digital terminal 94 (S18), the main processor 50 transmits the SMS data to the digital terminal extension line interface unit 70 (S28). The digital terminal extension line interface unit 70 transmits the SMS data to the corresponding digital terminal 94 (S30). The digital terminal 94 displays the transmitted SMS data on the display unit.

As described above, the related art SMS switching PBX and methods have various disadvantages. For example, in the related art SMS switching private branch exchange, each port of the analog office line interface unit, the ISDN office line interface unit, and the SLT extension line interface unit has to be provided with an SMS unit for exclusive use. Thus, the SMS can not be provided through an office line or the SLT extension line to which an SMS unit is not connected for exclusive use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

One embodiment of the present invention provides an SMS switching private branch exchange system and method that can efficiently switch SMS without being provided with an SMS unit for exclusive use at an office line interface unit of a private branch exchange or at an SLT extension line interface unit. Another embodiment of the present invention provides an SMS switching private branch exchange system and method that can simultaneously realize functions of SMS signal detection, SMS signal generation, and voice mail service in one board with one chip set, in which a digital signal processor DSP used for voice compression decodes an SMS signal of a PCM format in a voice mail interface unit of a private branch exchange and generates a signal of a PCM format.

Another embodiment of the present invention provides an SMS switching private branch exchange system that can share a DSP for wholly performing functions of SMS signal detection, SMS signal generation, and voice mail service as a system resource. Another embodiment provides a method for accomplishing the same.

Another embodiment provides an SMS switching private branch exchange system that can include an office line interface unit which interfaces with an office line; a voice mail interface unit which converts a PCM format SMS signal transmitted from the office line interface unit into SMS data, and converting a format of the SMS data corresponding to a kind of a terminal that will receive SMS; a control unit which switches a PCM channel of an office line to which a speech path is connected into a PCM channel of a usable DSP, and certifying a kind of a terminal which will receive SMS; and an extension line interface unit which transmits an SMS signal having a format corresponding to a kind of the terminal certified by the control unit.

Another embodiment provides a method for switching SMS of a private branch exchange system that can include certifying whether a usable DSP exists or not when an office line and a speech path are connected to each other; transmitting an SMS signal transmitted from the office line to the DSP if the usable DSP exists; certifying an extension line terminal which will receive the SMS signal; and transmitting the SMS signal to the certified extension line terminal from the DSP.

Another embodiment provides a method for switching SMS of a private branch exchange system that can include switching a PCM channel of an office line interface unit into a PCM channel of a usable DSP if a speech path is connected to the office line interface unit; transmitting an SMS signal to the DSP from the office line interface unit through the PCM channels; decoding the SMS signal transmitted to the DSP; switching the PCM channel of the DSP into a PCM channel of an SLT extension line interface unit if an extension line terminal which will receive the SMS signal is an SLT; and switching an SMS data channel of the DSP into an SMS data channel of a digital terminal extension line interface unit if an extension line terminal which will receive the SMS signal is a digital terminal.

Another embodiment provides a private branch exchange system that can include a single digital signal processor that receives a short message service signal in a first format and converts the short message service signal into a second format and a controller that controls the digital signal processor and determines the second format.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 shows a related art method for switching SMS in a digital private branch exchange;

FIG. 3 is a diagram showing an SMS switching private branch exchange system according to a preferred embodiment of the present invention; and FIGS. 4A and 4B are flowcharts that show a method for switching SMS in a private branch exchange system according to a preferred embodiment of the present invention.

DETAILED DESCRIPTION OF PREFERRED EMBODIMENTS

Figure 1:
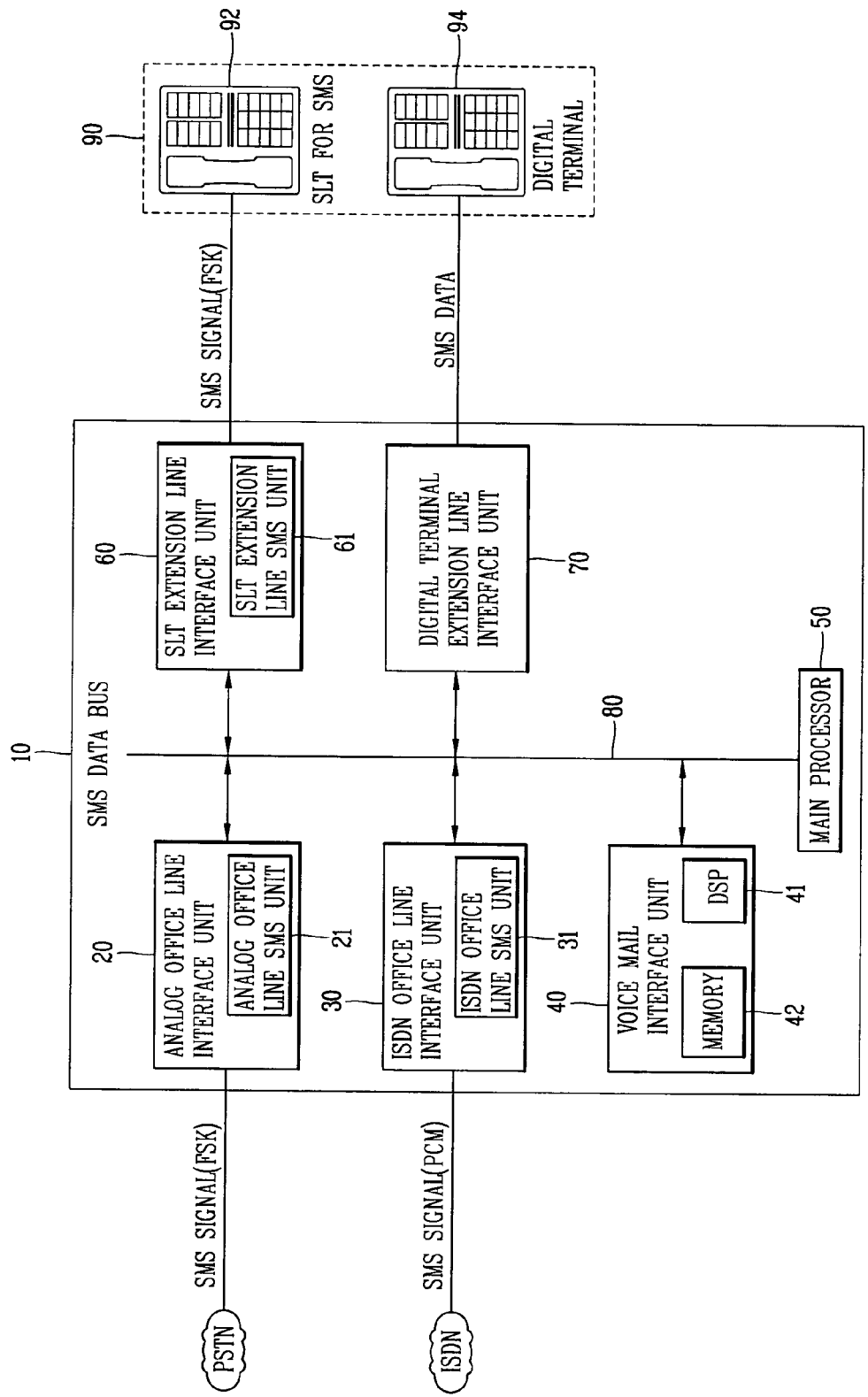
FIG. 1 is a diagram showing a related art digital private branch exchange for exchanging SMS.

FIG. 3 is a diagram showing construction of an SMS switching private branch exchange system according to a preferred embodiment of the present invention. As shown in FIG. 3, an SMS switching private branch exchange system can convert an SMS signal received through an office line such as a public switched telephone network (PSTN), an ISDN, etc. into a format corresponding to an extension line terminal by using a shared DSP (e.g., shared by time division), and then switches to the corresponding extension line terminal.

As shown in FIG. 3, an extension line terminal 200 can include a SLT for SMS 210; and a digital terminal 220. A private branch exchange system 100 can include: an analog office line interface unit 110; an ISDN office line interface unit 120; a voice mail interface unit 130; an SLT extension line interface unit 150; a digital terminal extension line interface unit 160; and a main processor 140.

The analog office line interface unit 110, the ISDN office line interface unit 120, the voice mail interface unit 130, the SLT extension line interface unit 150, and the main processor 140 are preferably coupled to one another by a PCM bus 170. Also, the voice mail interface unit 130, the digital terminal extension line interface unit 160, and the main processor 140 are preferably coupled to one another by an SMS data bus 180. The analog office line interface unit 110 interfaces with an analog office line such as a PSTN, etc. The analog office line interface unit 110 can include a CODEC 111 for performing a conversion between an SMS signal of a frequency shift keying (FSK) format and an SMS signal of a PCM format.

The ISDN office line interface unit 120 interfaces with an ISDN office line. The ISDN office line interface unit 120 transmits/receives an SMS signal of a PCM format between an ISDN office line and the PCM bus 170 preferably by a control of the main processor 140. The voice mail interface unit 130 can perform functions of SMS signal decoding, SMS signal generation, and voice mail service. The voice mail interface unit 130 can include a digital signal processor (DSP) 131 for compressing voice, reproducing the compressed voice, converting an SMS signal of a PCM format into SMS data, and generating an SMS signal of a PCM format from SMS data; and a memory 132 for storing the compressed voice and decoded SMS data. The main processor 140 can control the entire private branch exchange system 100, and switch an SMS signal of a PCM format and an SMS data according to an extension line terminal.

The SLT extension line interface unit 150 couples an SLT 210 and the private branch exchange system 100. The SLT extension line interface unit 150 can include a CODEC 151 for performing a conversion between the switched SMS signal of a PCM format and an SMS signal of an FSK format received from an SLT 210. The digital terminal extension line interface unit 160 couples the private branch exchange system 100 and the digital terminal 220.

Operations of the private branch exchange system according to an embodiment of the present invention will now be described. If a speech path for SMS is coupled through a specific office line, the private branch exchange system 100 certifies whether a usable conversion unit such as DSP 131 exists or not. If the usable DSP 131 exists, an SMS signal is received from a corresponding office line and the received SMS signal is converted into SMS data through the DSP 131. The private branch exchange system 100 preferably converts a format of the SMS data according an extension line terminal that will receive the SMS data, and switches to a corresponding extension line terminal.

Figure 4A:
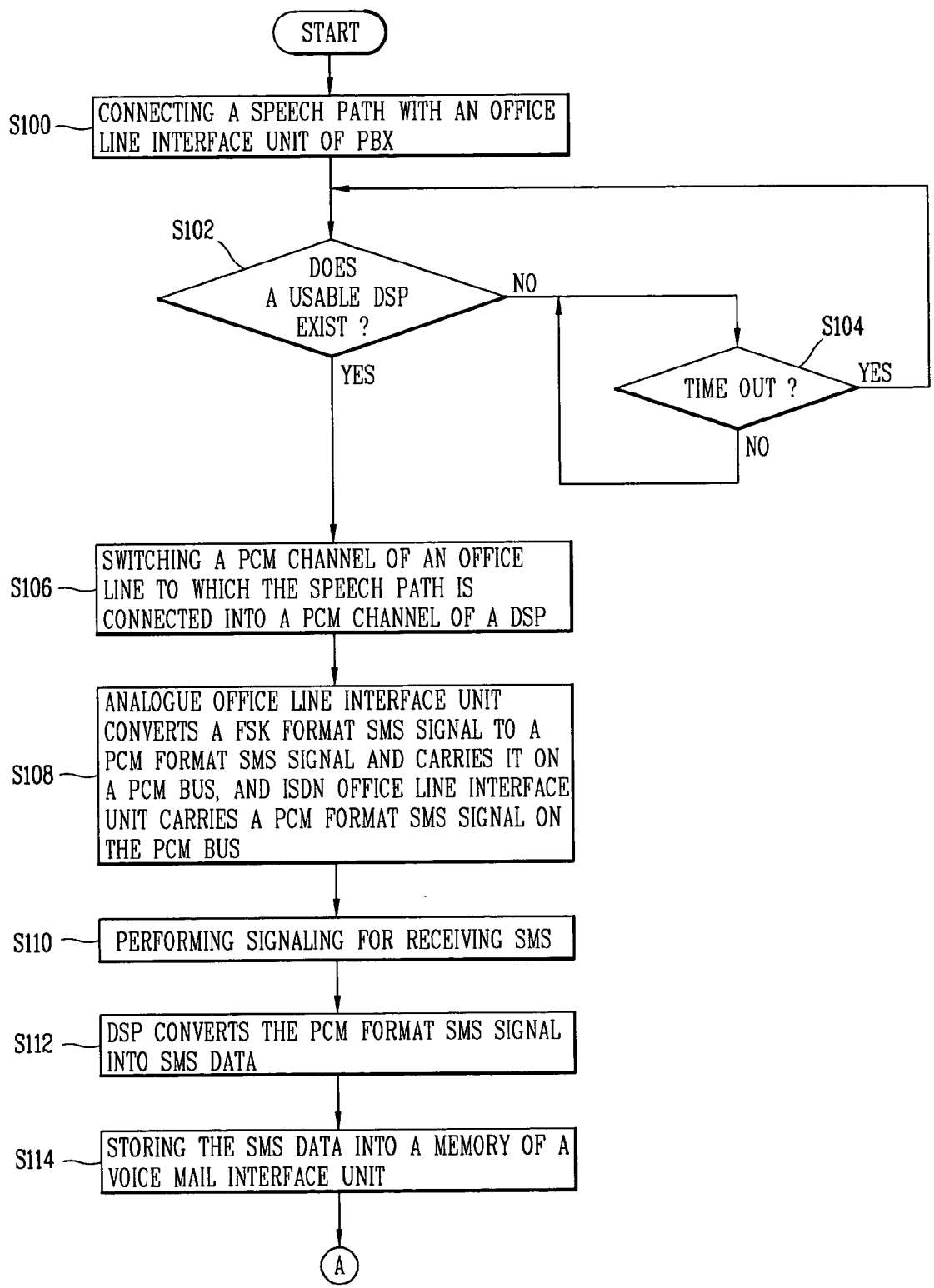

FIGS. 4A and 4B show a method for switching SMS in a private branch exchange system according to a preferred embodiment of the present invention. The method shown in FIGS. 4A-4B will be exemplarily described using the PBX 100. However, the present invention is not intended to be so limited. As shown in FIGS. 4A and 4B, if a speech path for SMS is coupled through a specific office line before receiving an SMS signal (S100), the main processor 140 of the private branch exchange system 100 certifies whether the usable DSP 131 exists in the voice mail interface unit 130 (S102).

If the usable DSP 131 does not exist at present, the main processor 140 waits for a period of time and then certifies again whether the usable DSP 131 exists or not (S104). If the usable DSP 131 exists, the main processor 140 can switch a PCM channel of an office line to which the speech path is coupled into a PCM channel of the DSP 131 (S106). When the office line to which the speech path is coupled is a PSTN office line, the analog office line interface unit 110 of the private branch exchange system 100 converts an SMS signal of an FSK format transmitted through an analog office line into an SMS signal of a PCM format preferably through the CODEC 111, and carries the converted SMS signal of the PCM format on the PCM bus 170. When the office line to which the speech path is coupled is an ISDN office line, the IDSN office line interface unit 120 of the private branch exchange system 100 carries an SMS signal of a PCM format transmitted through an IDSN office line on the PCM bus as it is (S108).

The main processor 140 performs signaling for receiving an SMS signal and then starts to receive an SMS signal (S110). The DSP 131 decodes the SMS signal of the PCM format carried on the PCM bus 170 and converts it to SMS data (S112). The converted SMS data can be stored in the memory 132 of the voice mail interface unit 130 (S114) transmitted or the like.

The main processor 140 can determine or certify whether an extension line terminal that will receive the SMS data is a digital terminal or an SLT (S116). If the extension line terminal that will receive the SMS data is an SLT 210, the main processor 140 switches a PCM channel of an extension line that will receive the SMS data into a PCM channel of the DSP 131 (S118). Then, the main processor 140 performs signaling with the SLT 210 that will receive the SMS (S120). If the signaling with the SLT 210 is completed, the DSP 131 converts the SMS data stored in the memory 132 into an SMS signal of a PCM format and then transmits the signal on the PCM bus 170 (S122).

The SLT extension line interface unit 150 converts the SMS signal carried on the PCM bus 170 into an FSI format preferably through the CODEC 151, and transmits the converted SMS signal of an FSK format to the SLT 210 (S124). Then, the SLT 210 can preferably display the transmitted SMS signal on a display unit.

In the step S16, if the extension line terminal that will receive the SMS data is the digital terminal 220, the main processor 140 couples a SMS data channel of an extension line which will receive the SMS data with a SMS data channel of the DSP 131. The DSP 131 transmits the SMS data stored in the memory 132 on the SMS data bus 180 as it is (S126). Then, the digital terminal extension line interface unit 160 receives the SMS data carried on the SMS data bus 180, and transmits the received SMS data to the digital terminal 220 (S128). The digital terminal 220 displays the transmitted SMS data on a display unit.

Although preferred embodiments of systems and methods were described as signals originating from office lines for delivery to extension lines, the present invention is not intended to be so limited. For example, signals can be transmitted from extension lines for delivery to office lines according to preferred embodiments.

As described above, preferred embodiments of a PBX and methods thereof according to the present invention have various advantages. For example, according to preferred embodiments, a conversion function such as, the DSP, which can also be used for voice compression, decodes an SMS signal of a PCM format and generates SMS data in an SMS signal of a PCM format, so that functions of SMS signal detection, SMS signal generation, and voice mail service may be simultaneously realized preferably in one board with one chip set and the DSP may be shared as a system resource. Also, the SMS can be efficiently switched without providing an SMS unit for exclusive use at the office line interface unit, the IDSN office line interface unit, and the SLT extension line interface unit, respectively.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A short message service switching private branch exchange (PBX) system, comprising:
   an office line interface unit of the PBX system that interfaces with office lines;
   a voice mail interface unit of the PBX system including a digital signal processor and a memory, the voice mail interface unit converting a first pulse code modulation format short message service signal transmitted from the office line interface unit into short message service data, and converting the short message service data into a format of a terminal that will receive the short message service data;

a control unit of the PBX system that switches a pulse code modulation channel of an office line to which a speech path is coupled into a pulse code modulation channel of the digital signal processor, and determines a type of the terminal that will receive the short message service data; and an extension line interface unit of the PBX system that transmits a short message service signal having the format corresponding to the type of the terminal determined by the control unit, wherein the digital signal processor converts the pulse code modulation format short message service signal transmitted from the office line interface unit into the short message service data by decoding, the digital signal processor converting the short message service data into a second pulse code modulation format short message service signal when the short message service data is to be transmitted to a single line terminal, and the digital signal processor outputs the short message service data as is when the short message service data is to be transmitted to a digital terminal, the memory storing the short message service data, and wherein the control unit determines whether a digital signal processor resource of the digtal signal processor is available when a speech path is connected, the control unit further waits for a prescribed time until the digital signal processor resource of the digital signal processor becomes available when the digital signal processor resource is not available, and finishes a reception of the short message service signal if when the digital signal processor resource becomes available after the prescribed time has elapsed.

2. The system of claim 1, wherein the office line interface unit comprises at least one of:

an analog office line interface unit that couples to an analog office line and converts an analog format of a short message service signal transmitted through the analog office line into a pulse code modulation format; and an integrated services digital network office line interface unit that couples an integrated services digital network office line and receives a short message service signal of a pulse code modulation format through the integrated services digital network office line.

3. The system of claim 1, wherein the extension line interface unit comprises at least one of:

an single line terminal extension line interface unit that couples to the single line terminal and converts the pulse code modulation format short message service signal into an analog format short message service signal by using a coder/decoder; and a digital terminal extension line interface unit that couples to a the digital terminal.

4. The system of claim 2, wherein the voice mail interface unit comprises:

the digital signal processor that converts the first pulse code modulation format short message service signal transmitted from the office line interface unit into the short message service data by decoding, converting the short message service data into the second pulse code modulation format short message service signal when the short message service data is to be transmitted to the single line terminal, and outputs the short message service data as is when the short message service data is to be transmitted to the digital terminal, and the memory that stores the short message service data, and wherein the extension line interface unit comprises:

a single line terminal extension line interface unit that couples to the single line terminal and converts the second pulse code modulation format short message service signal into an analog format short message service signal by using a coder/decoder, and a digital terminal extension line interface unit that couples to the digital terminal.

5. A method for operating a private branch exchange system, comprising:

determining whether a digital signal processor of a voice mail interface unit can be detected when an office line and a speech path are connected to each other;

transmitting a short message service signal transmitted from the office line to the digital signal processor when the digital signal processor is detected as usable;

determining an extension line terminal that will receive the short message service signal;

transmitting the short message service signal to the determined extension line terminal from the usable digital signal processor;

waiting for a prescribed detection time when the digital signal processor is not detected as usable; and finishing a reception of the short message service signal when the usable digital signal processor becomes usable after the prescribed detection time has elapsed, wherein the digital signal processor converts the received short message service signal into short message service data, stores said data in said unit and generates a short message service message of said data corresponding to the extension line terminal according to a main processor, wherein the usable digital signal processor generates another pulse code modulation format short message service signal when the extension line terminal is a single line terminal, and generates the short message service data when the extension line terminal is a digital terminal.

6. The method of claim 5, wherein when the office line is a public switched telephone network office line, a switched telephone network office line interface unit converts a frequency shift keying format short message service signal to a pulse code modulation format short message service signal and transmits the pulse code modulation format short message service signal to the digital signal processor.

7. The method of claim 5, wherein when the office line is an integrated services digital network office line, an integrated services digital network office line interface unit transmits a pulse code modulation format short message service signal to the digital signal processor.

8. The method of claim 5, wherein the pulse code modulation format short message service signal is converted into a frequency shift keying format short message service signal by a coder/decoder and the frequency shift keying format short message service signal is transmitted to the single line terminal.

9. A method for switching short message service of a private branch exchange (PBX) system, comprising:

switching a pulse code modulation channel of an office line interface unit to a pulse code modulation channel of a digital signal processor of a voice mail interface unit if a speech path is connected to the office line interface unit;

transmitting a short message service signal to the digital signal processor from the office line interface unit through the pulse code modulation channel;

decoding the short message service signal transmitted to the digital signal processor to data and storing said data in said unit;

switching the pulse code modulation channel of the digital signal processor to a channel of a second pulse modulation format of a single line terminal extension line interface unit when an extension line terminal that will receive the short message service signal is a single line terminal; and switching a short message service data channel of the digital signal processor to a short message service data channel of a digital terminal extension line interface unit when the extension line terminal that will receive the short message service signal is a digital terminal, wherein a control unit determines whether a digital signal processor resource of the digital signal processor is available when a speech path is connected, the control unit waiting for a prescribed time until the digital signal processor resource becomes available when the digital signal processor resource is not available, and finishes a reception of the short message service signal when the digital signal processor resource becomes available after the prescribed time has elapsed, wherein the digital signal processor is only a signal digital signal processor of the PBX system.

10. The method of claim 9, wherein when the office line interface unit is a switched telephone network office line interface unit, a frequency shift keying format short message service signal transmitted through a switched telephone network office line is converted into a pulse code modulation format short message service signal and the pulse code modulation format short message service signal is transmitted to the digital signal processor.

11. The method of claim 9, wherein when a pulse code modulation format short message service signal is transmitted through the pulse code modulation channel of the digital signal processor, the single line terminal extension line interface unit converts the PCM format short message service signal into a frequency shift keying format short message service signal and transmits the frequency shift keying format short message service signal to a single line terminal.

12. A private branch exchange (PBX) system, comprising:

a single digital signal processor of a voice mail interface unit of the PBX system that receives a short message service signal in a first format and converts the short message service signal into a second format short message service signal; and a controller of the PBX system that controls the digital signal processor and determines the second format, wherein the digital signal processor converts the first format short message service signal into the second format short message service signal by converting the first format short message service signal into short message service data, storing said data in said unit and converting the short message service data to the second format short message service signal, the converting the first format short message service signal into the short message service data comprising decoding, converting the short message service data into the second format short message service signal when the short message service data is transmitted to a single line terminal, and outputting the short message service data as is when the short message service data is transmitted to a digital terminal, wherein the controller determines whether a digital signal processor resource of the single digital signal processor is available when a speech path is connected, waits for a prescribed time until the digital signal processor resource becomes available when the digital signal processor resource is not available, and finishes a reception of the short message service signal in the first format after the prescribed time has elapsed and the digital signal processor resource becomes available.

13. The system of claim 12, wherein the digital signal processor receives the first format short message service signal in one of an office line of the system and an extension line of the system, and transmits the converted second format short message service signal to the other one of the office line and the extension line.

14. The system of claim 13, wherein the single digital signal processor is in a voice mail interface unit.

15. The system of claim 12, wherein the single digital signal processor performs short message service detection, short message service generation and compressing of voice.

16. The system of claim 1, wherein the digital signal processor comprises only a single digital signal processor.

17. The system of claim 1, wherein the single digital signal processor performs short message service detection, short message service generation and compressing of voice.

18. The system of claim 1, wherein the extension line interface unit transmits the short message service signal in an analog format when the short message service data is transmitted to the signal line terminal.

* * * * *